E. J. MAIRE.
PIPE COUPLING.
APPLICATION FILED AUG. 4, 1915.
1,171,219.
Patented Feb. 8, 1916.
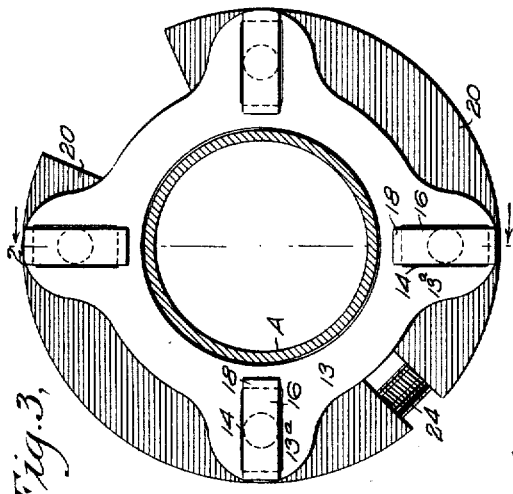
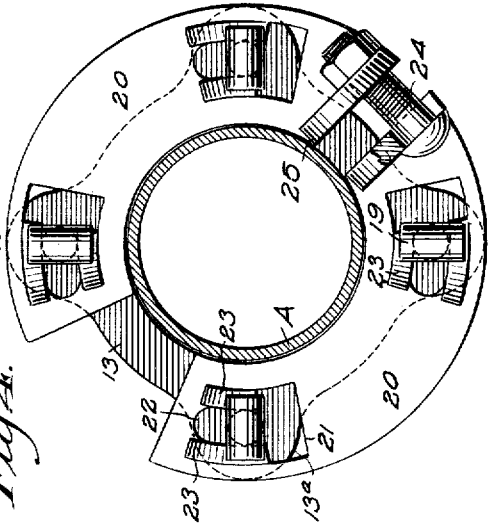
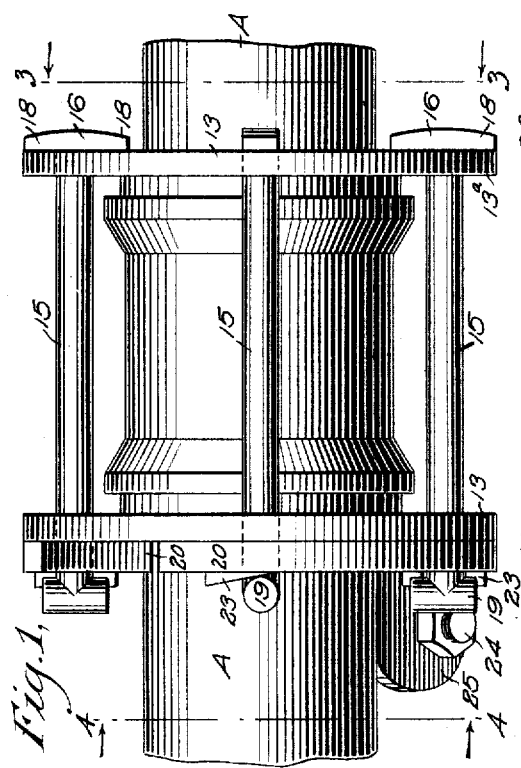
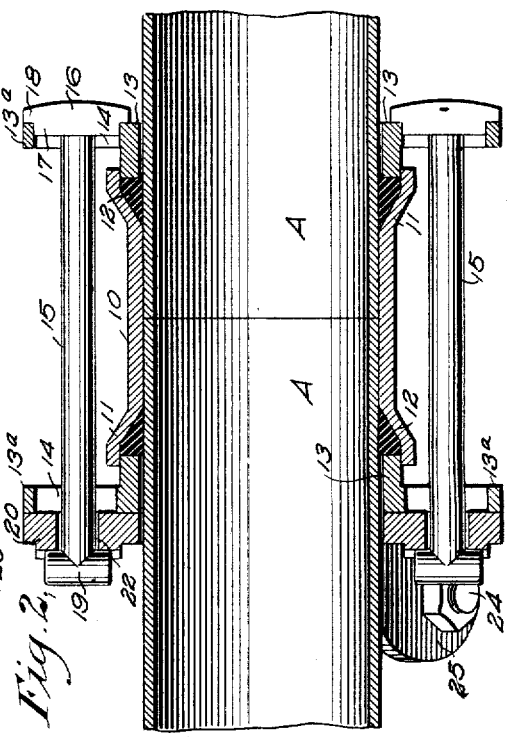
WITNESSES
Edw. Thorpe
J. L. McAuliffe
INVENTOR
E. J. Maire
BY Munn & Co
ATTORNEYS

UNITED STATES PATENT OFFICE.

EDWARD J. MAIRE, OF LIMA, OHIO.

PIPE-COUPLING.

1,171,219.  Specification of Letters Patent.  Patented Feb. 8, 1916.

Application filed August 4, 1915. Serial No. 43,557.

*To all whom it may concern:*

Be it known that I, EDWARD J. MAIRE, a citizen of the United States, and a resident of Lima, in the county of Allen and State of Ohio, have invented a new and Improved Pipe-Coupling, of which the following is a full, clear, and exact description.

My invention is more particularly intended for gas lines but may be employed for connecting pipes generally for conveying oil, water or other fluids.

An object of the invention is to provide a coupling which may be readily applied to the plain unflanged ends of pipe sections and insure a fluid-tight joint.

The invention also has for its object to effect the coupling of the pipe sections without the employment of threads on the pipe sections or on the coupling elements.

Other purposes and advantages will appear as the description proceeds.

In carrying out my invention use is made of a sleeve adapted to receive adjacent ends of pipes to be connected, so that the ends of pipe will abut. The sleeve ends are flared, presenting tapered annular seats to receive gaskets. A follower is employed at each end fitting in the flared ends of the sleeve to bear against and expand the gaskets, which preferably are of rubber. T-headed bolts extend between the followers and at one end the bolts project beyond the adjacent follower. At the said projecting end of the bolts a gland is arranged formed of segmental sections adapted to be drawn together by a transverse bolt and the gland is formed with inclines to bear against the adjacent heads of the bolts and thereby move the followers toward each other, exerting a compressing action against the gaskets.

The invention will be more particularly explained in the specific description following.

Reference is to be had to the accompanying drawings forming a part of this specification, in which similar characters of reference indicate corresponding parts in all the views.

Figure 1 is a side elevation of a pipe coupling of my invention showing the same applied. Fig. 2 is a longitudinal vertical section on the line 2—2, Fig. 3. Fig. 3 is an end view with a pipe in section on the line 3—3, Fig. 1. Fig. 4 is a view similar to Fig. 3, the section being taken on the line 4—4, Fig. 1.

In constructing a practical embodiment of my invention in accordance with the illustrated example, a sleeve 10 is provided adapted to receive the opposed ends of pipe sections A to be coupled. The sleeve is of smooth bore and unthreaded and the ends 11 thereof are flared, presenting annular tapered seats to receive gaskets 12 which preferably are of rubber.

Arranged in connection with the ends of the sleeve and adapted to surround the pipe sections and enter the flared ends of the sleeve are ring followers 13. The followers 13 have radial lugs 13ª which are formed with radial slots 14.

Bolts 15 are arranged longitudinally outside the sleeve 10. At one end each bolt is formed with a T-head 16, the inner side of which is of reduced length thereby presenting projecting ends 18 which overlie the lugs 13ª while the reduced portions 17 enter the slots 14, the arrangement serving to prevent displacement of the bolts relatively to the follower with which the head 16 is engaged. The opposite end of each bolt has a T-head 19 of less length than the head 16 whereby it may be passed through the slot 14 in the follower 13.

The ends of the bolts 15 bearing the heads 19 extend beyond the adjacent follower 13 and a gland is employed composed of two segmental sections 20 which are received between the heads 19 and the adjacent follower. In the gland sections 20 slots are formed presenting radial openings 21 and narrower transverse openings 22 so that generally the slots 21 and 22 present together approximately a T-shape, the openings 22 being curved. On the gland segment 20, inclines 23 are provided at the sides of the openings 22 and adapted to be positioned directly beneath the bolt heads 19.

Connecting the segmental sections 20 at one end is a transverse bolt 24 which extends through lugs 25 on the respective gland sections, the said lugs being formed with openings for the bolt 24, the openings being preferably in the form of slots extending from the outer edges of the said lugs as shown in Fig. 4.

By the described construction the parts having been assembled as shown in the drawings, it will be seen that by turning the bolt 24 in a manner to draw the gland sections 20 together, the inclines 23 thereon will act upon the bolt heads 19 and thereby the followers 13 will be forced toward each other, the one follower receiving direct pressure of the gland sections 20 and the other follower receiving pressure of the bolt heads 16. The result will be that the gaskets 12 will be expanded in their seats and form an effective fluid tight closure in the coupling sleeve at each end.

Having thus described my invention, I claim as new, and desire to secure by Letters Patent:

1. A pipe coupling including a coupling sleeve adapted to receive pipe sections, the said sleeve being formed with enlarged ends presenting annular seats adapted to receive gaskets, followers fitting the sleeve ends to press the gaskets therein, bolts extending longitudinally outside the sleeve, the said bolts engaging at one end with one follower and at the opposite ends passing through the other follower and formed with heads, a gland formed of separate segments presenting slots receiving the said bolts, there being inclines on the gland segments at said slots, on which inclines the adjacent heads of the bolt are adapted to seat, and means to draw the segments together and give transverse movement to the inclines beneath the bolt heads.

2. A pipe coupling including a coupling sleeve to receive the ends of pipe sections and presenting seats adapted to receive gaskets, sliding followers adjacent to said seats, a gland adjacent to one of the said followers, the said gland being formed of segments, and means to draw the followers toward the gasket seats by the movement of the segments of the gland toward each other.

3. A pipe coupling comprising a sleeve adapted to receive the ends of pipe sections, said sleeve having flaring ends presenting tapering gasket seats, gaskets conforming approximately to the said seats, ring followers at the ends of the sleeve adapted to exert pressure against the gaskets, the said followers having slots therein, bolts outside the sleeve and formed with T-heads, the bolts extending through the slots of the followers, the T-head at one end of each bolt engaging in the slots of the adjacent follower, the T-head at the opposite end being adapted to pass through the follower and be positioned beyond same, a gland formed of separate segments and provided with inclines on which the adjacent bolt heads are adapted to seat, and means to draw the said segments together.

4. A pipe coupling including a coupling sleeve having seats at its ends adapted to receive gaskets, followers adjacent to the ends of the sleeve and adapted to exert pressure on the gaskets, bolts ranging lengthwise outside of the sleeve, the said bolts engaging at one end with the adjacent follower and a gland adjacent to the other follower and means to give transverse movement to the gland relatively to the bolts, there being co-acting members on the bolts and gland to cause the bolts to force the followers toward each other by the said relative transverse movement of the gland.

5. A pipe coupling including a sleeve adapted to receive the ends of pipe sections, the said sleeve presenting gasket seats at its ends, followers adjacent to the ends of the sleeve adapted to be moved toward the gasket seats, the followers being formed with slots, bolts extending through the slots of the followers and provided with T-heads, the heads of the bolts at one end of the latter engaging the adjacent slotted follower, the opposite ends of the bolts extending beyond the follower adjacent thereto, the heads on said opposite ends being positioned beyond the follower, a gland formed of segmental sections, the sections being slotted, presenting inclines on which the adjacent bolt heads are adapted to seat, said gland sections furthermore having lugs thereon near opposite ends thereof, the lugs presenting slots opening at the edges of the lugs and a bolt passing through said lugs and received in said slots.

In testimony whereof I have signed my name to this specification in the presence of two subscribing witnesses.

EDWARD J. MAIRE.

Witnesses:
HAROLD SMITH,
F. L. MAIRE.

Copies of this patent may be obtained for five cents each, by addressing the "Commissioner of Patents, Washington, D. C."